United States Patent [19]

Cherukuri et al.

[11] 4,271,199
[45] Jun. 2, 1981

[54] SUGAR-CONTAINING CHEWING GUM HAVING SMOOTH TEXTURE AND LONG-LASTING SWEETNESS

[75] Inventors: Subraman R. Cherukuri, Danbury, Conn.; Walter Vink, Purdys Station, N.Y.; Dominick R. Friello, Danbury, Conn.; Donald A. M. Mackay, Pleasantville, N.Y.

[73] Assignee: Life Savers, Inc., New York, N.Y.

[21] Appl. No.: 96,961

[22] Filed: Nov. 23, 1979

[51] Int. Cl.³ .............................................. A23G 3/30
[52] U.S. Cl. .................................... 426/5; 426/658
[58] Field of Search ................................ 426/3–6, 426/658

[56] References Cited

U.S. PATENT DOCUMENTS

| | | | |
|---|---|---|---|
| 1,711,281 | 4/1929 | Mowrey | 426/3 |
| 2,301,331 | 11/1942 | Schantz | 426/3 |
| 3,262,784 | 7/1966 | Bucher | 426/3 |
| 3,352,689 | 11/1967 | Bilotti | 426/3 |
| 3,655,866 | 4/1972 | Bilotti | 426/3 |
| 3,795,744 | 3/1974 | Ogawa et al. | 426/3 |
| 3,851,073 | 11/1974 | Cook | 426/3 |
| 3,974,293 | 8/1976 | Witzel | 426/4 |
| 3,982,023 | 9/1976 | Bahoshy et al. | 426/3 |
| 4,000,320 | 12/1976 | Klose et al. | 426/3 |
| 4,157,401 | 6/1979 | Stroz | 426/4 |

*Primary Examiner*—Jeanette M. Hunter
*Attorney, Agent, or Firm*—Lawrence S. Levinson; Burton Rodney

[57] ABSTRACT

An improved sugar-containing chewing gum is provided which has long-lasting sweetness, soft and smooth consistency, an amorphous bite through and enhanced flavor and is non-sticky, and is formed of gum base, a premixed recrystallized combination of liquid and solid sweeteners which preferably include high fructose syrup alone or together with liquid glucose, corn syrup, sorbitol syrup and/or invert sugar in combination with sucrose or sorbitol and water, and flavors, softeners, and other conventional chewing gum ingredients.

The above chewing gum formulation will have a short nougat-like or fondant-like structure and is particularly suitable as a non-stick bubble gum which does not stick to its wrapper.

15 Claims, No Drawings

SUGAR-CONTAINING CHEWING GUM HAVING SMOOTH TEXTURE AND LONG-LASTING SWEETNESS

FIELD OF THE INVENTION

The present invention relates to a long-lasting sugar-containing chewing gum, including sugar-containing bubble gum, which has a soft non-sticky short nougat-like or fondant-like structure formed of gum base and a premixed combination of liquid and solid sweeteners which preferably include a recrystallized mixture of fructose and sucrose, and to a method for forming such chewing gum.

BACKGROUND OF THE INVENTION

Recently, soft bubble gums have been introduced into the marketplace with resounding success. One such soft bubble gum contains a relatively large amount of water to give the gum a juicy taste and soft consistency and is packaged in a unique manner so that the water is retained in the bubble gum even during storage.

Another type of soft bubble gum makes use of a relatively large amount of a polyisobutylene gum base in place of a natural rubber or styrene-butadiene rubber, and sugar, corn syrup and corn syrup solids and is apprently free of binders such as dextrins to provide an initial soft discontinuous structure which upon chewing converts to a continuous structure suitable for blowing bubbles. However, such gum has been found to stick to its wrap especially during the warm seasons.

DESCRIPTION OF THE INVENTION

In accordance with the present invention, there is provided an improved sugar-containing chewing gum which is non-sticky, has a short nougat-like or fondant-like structure, a long-lasting sweetness, a soft and smooth consistency, an amorphous bite through and enhanced flavor, and is formed of gum base, a premixed crystallized combination of at least two sweetners, including solid and liquid sweeteners, which preferably include sucrose and/or sorbitol and/or hydrogenated starch hydrolysate, and high fructose syrup alone or together with liquid glucose, hydrogenated starch hydrolysate syrup, corn syrup, sorbitol syrup and/or invert sugar, in the recrystallized mixture, and flavors, softeners and other conventional chewing gum ingredients. The above chewing gum is particularly suitable as a bubble gum.

It is essential that the liquid and soild sweeteners mentioned above comprise a preformed combination of a particulate solid sweetener particles of which are coated with a syrup sweetener and which mixture has been heated, dried to a homogeneous mass, and then cooled to recrystallize the mass into an amorphous solid. The recrystallized sweeteners impart a soft smooth consistency and texture to the chewing gum, similar to that found in nougat-type or fondant-type candies and non-stick properties as well.

Furthermore, the above premixed combination of sweeteners may comprise a so-called "dry fondant" mix formed of the above mentioned sweeteners which is reconstituted with water and then added to the gum base and other chewing gum ingredients to form the chewing gum of the invention.

In addition, it has also been found that the sweetening power of each of fructose alone and sucrose alone is enhanced by employing one in preformed combination with the other.

The preferred chewing gum of the invention comprises a sugar-containing chewing gum which includes gum base in an amount within the range of from about 12 to about 40% and preferably from about 15 to about 35% by weight of the chewing gum, which includes a preformed recrystallized combination of liquid and solid sweeteners comprising from about 40 to about 85%, and preferably from about 60 to about 80% by weight of the chewing gum.

The preformed sweetener combination will comprise solid sweeteners, such as sucrose, lactose, maltose, sorbitol, fructose, dextrose, arabinose, xylose, ribose, mannose, galactose, hydrogenated starch hydrolysate, or mixtures of two or more of the foregoing, and liquid sweeteners, such as any of the above dissolved in water, such as corn syrup, sorbitol syrup, fructose syrup, invert syrup, glucose syrup, hydrogenated starch syrups, and the like. The above syrups will preferably contain from about 50 to about 99% by weight solids and preferably from about 70 to about 90% by weight solids. The solids and liquids will be employed in the preformed sweetener combination in a weight ratio to each other (solids:liquids) of within the range of from about 1:1 to about 30:1 and preferably from about 2:1 to about 19:1.

It is theorized that upon pre-mixing of the solid sweeteners and liquid sweeteners, the crystals of solid sweetener, such as crystals of sugar, are reduced in size, becoming more round, more smooth and slippery, and thereby contributing to the soft easy bite through and fondant structure of the chewing gum. This is indeed surprising and unexpected inasmuch as this effect is opposite to the usual behavior of powdered crystals added to water wherein there is an apparent coarsening effect due to preferential solubility of fine crystals.

The finished chewing gum containing the small smooth particles of sweetener coated with liquid sweetener in accordance with the present invention is not only soft and easy to break apart, but is non-sticky as well, is easy to package and just as easy to unwrap.

Particularly preferred preformed sweetener combinations wherein a solid sweetener is coated with a syrupy sweetener, comprise from about 35 to about 95% sucrose (or sucrose dissolved in water) as the solid sweetener and from about 5 to about 50% high fructose syrup (containing from about 40 to about 90% fructose), alone or in combination with from about 1 to about 30% liquid glucose, from about 1 to about 30% corn syrup, from about 1 to about 25% invert sugar, all of the above % being based on the weight of the preformed combination of solid and liquid sweeteners. In such preferred combinations, the solid sweetener will be employed in a weight ratio to the liquid sweetener of within the range of from about 1:1 to about 30:1.

The hydrogenated starch syrup also referred to as hydrogenated starch hydrolysates, which may be employed herein may include those disclosed in Reissue Pat. No. 26,959 or U.S. Pat. No. 3,556,811 as well as various hydrogenated glucose syrups and/or powders which contain sorbitol, hydrogenated disaccharides, hydrogenated tri- to hexa-saccharides, and hydrogenated higher polysaccharides, or mixtures of any two or more of the above.

The hydrogenated glucose syrups and/or powders may be produced by catalytic hydrogenation of standard glucose syrups (acid and/or engyme converted) to the point where all the glucose end groups of the saccharides are reduced to alcohols, that is, dextrose end groups to sorbitol end groups. In the case of hydrogenated glucose syrups, the total solids are made of from about 4 to about 30% sorbitol, from about 5 to about 65% hydrogenated disaccharides (that is, maltitol), from about 15 to about 75% tri- to hepta-hydrogenated saccharides, and from about 10 to about 65% hydrogenated saccharides higher than hepta.

Examples of particularly suitable hydrogenated starch hydrolysates include from about 6 to about 10% sorbitol, from about 25 to about 55% hydrogenated disaccharides, from about 20 to about 40% hydrogenated tri- to hepta-saccharides, and from about 15 to about 30% hydrogenated saccharides higher than hepta.

Another example of suitable hydrogenated starch hydrolysates include from about 8 to about 20% sorbitol, from about 5 to about 15% hydrogenated disaccharides, and from about 2 to about 75% hydrogenated tri- to penta-saccharides.

Particularly preferred are hydrogenated starch hydrolysates of the following compositions.

|  | Parts by Weight | | |
| --- | --- | --- | --- |
|  | 1 | 2 | 3 |
| Sorbitol | 10.5 | 17 | 15 |
| Hydrogenated disaccharides | 7.5 | 13 | 10 |
| Hydrogenated tri- to penta-saccharides |  | 20 | 70 |
| Hydrogenated saccharides higher than penta and higher saccharide alcohols | 62 |  |  |

|  | Parts by Weight | | | |
| --- | --- | --- | --- | --- |
|  | 4 | 5 | 6 | 7 |
| Sorbitol | 5–8 | 6–8 | 6–8 | 5–8 |
| Hydrogenated disaccharides | 50–58 | 40–45 | 25–30 | 25–58 |
| Hydrogenated tri- to hexa-saccharides | 20–25 | 25–30 | 35–40 | 20–40 |
| Hydrogenated saccharides higher than hexa | 15–20 | 20–25 | 25–30 | 15–30 |

The hydrogenated starch hydrolysate as described above may be employed as a substitute for corn syrup, fructose syrup or other plasticizer or softener, sugar and even sugar alcohols.

The chewing gum will include a relatively water-insoluble, water-impenetrable gum base in an amount ranging from about 8 to about 50%, and preferably from about 15 to 40% by weight of the chewing gum composition.

In general, the gum base is prepared by heating and blending various ingredients, such as, natural gum, synthetic resins, waxes, plasticizers, etc., in a manner well known in the art. Typical examples of the ingredients found in a chewing gum base are masticatory substances of vegetable origin, such as chicle, crown gum, nispero, rosidinha, jelutong, pendare, perillo, niger gutta, tunu, etc., masticatory substances of synthetic origin, such as butadiene-styrene polymer, isobutylene-isoprene copolymer, petroleum wax, polyethylene, polyisobutylene, polyvinylacetate, etc., plasticizers, such as lanolin, stearic acid, sodium stearate, potassium stearate, etc., antioxidants, such as, butylated hydroxyanisole, butylated hydroxytoluene, and propyl gallate.

The water-insoluble gum base may consist of any of the various bases disclosed for example in U.S. Pat. Nos. 3,052,552 and 2,197,719. Typical ingredients included in gum base compositions are the following:

|  | Parts by Weight |
| --- | --- |
| Base I |  |
| Ester gum | 88 |
| Rubber latex solids | 10 |
| Lecithin | 2 |
| Base II |  |
| Chicle | 30 |
| Jelutong | 60 |
| Gutta soh | 8 |
| Lecithin | 2 |
| Base III |  |
| Partially oxidized chicle | 98 |
| Lecithin | 2 |
| Base IV |  |
| Jelutong (dry) | 80 |
| Gutta siak | 18 |
| Lecithin | 2 |

The chewing gum may also include flavoring, such as sour or fruit flavoring or non-acid or mint flavoring in an amount ranging from about 0.3 to about 2.0% by weight, and preferably from about 0.5 to about 1.2% by weight of the final gum product. The flavoring may comprise synthetic flavors and oils derived from plants, leaves, flowers, fruit, etc. Representative flavor oils of this type include acids such as adipic, succinic and fumaric acid, citrus oils such as lemon oil, orange oil, lime oil, grapefruit oil, fruit essences such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the chewing gum with or without conventional preservatives.

The chewing gum of the invention may also include a natural sugar including any of those set out hereinbefore in the listing of solid sweeteners employed in the preformed combination, as well as a non-sugar or artificial sweetener employed in conjunction with the preformed sweetener combination.

Examples of artificial sweeteners (also referred to a non-sugar sweeteners or sugar substitutes), which may be employed herein include poorly or readily water-soluble sweeteners, such as the free acid form of saccharin, sodium, calcium or ammonium saccharin salts, dihydrochalcones, glycyrrhizin, dipotassium glycyrrhizin, glycyrrhizic acid ammonium salt, L-aspartyl-L-phenylalanine methyl ester, the sodium salt or potassium salt of 3,4-dihydro-6-methyl-1,2,3-oxathiazine-4-one-2,2-dioxide (Ace-sulfame-K) as well as *Stevia rebaudiana* (Stevioside), *Richardella dulcifica* (Miracle Berry), *Dioscoreophyllum cumminsii* (Serendipity Berry), free cyclamic salts, and the like, or mixtures of any two or more of the above.

The chewing gum of the invention may also contain conventional ester gums, polydextrose, fillers, such as calcium carbonate, and texturizers, such as hydrated alumina, plasticizers, softeners or emulsifiers, such as lecithin, fatty acids, glycerin, glyceryl monostearate, hydrogenated vegetable oils, sorbitan monostearate, tallow, isomaltitol, propylene glycol, F.D.&C. coloring agents, and other conventional chewing gum additives as will be apparent to those skilled in the art.

The chewing gum of the invention may be prepared by the following procedure.

The preformed recrystallized sweetener combination is first prepared by heating a mixture of the solid sweetener (e.g., powdered sugars or liquid sugars in water) and the liquid sweetener (e.g., high fructose syrup, liquid glucose, corn syrup, invert sugar, or a mixture of two or more of the above) at a temperature within the range of from about 200° to about 260° F., and preferably from about 230° to about 250° F., with or without stirring, to form a homogeneous mass, and then cooling the homogeneous mass, for example, by exposing to ambient air or a cooled surface. One or more conventional techniques are employed, such as seeding or stirring to cause the sweeteners to recrystallize and form an amorphous mass.

As indicated, reconstituted "dry fondant" mix may also be employed.

The chewing gum is prepared by mixing melted gum base (heated at, for example, 160°-175° F.) and color, adding about one-third of the preformed sweetener combination and mixing for 1 to 3 minutes, adding a second one-third portion of preformed sweetener combination to the mixture and mixing for 1-2 minutes, adding softener and moisture retaining substance, such as corn syrup solids, and mixing for 1-2 minutes, adding softener, such as lecithin, and flavor, and mixing for 1-2 minutes, and then adding the remaining portion of preformed sweetener combination with stirring, and then optionally adding spray-dried flavor and mixing the entire mass for 2 to 5 minutes.

If desired, the above may be mixed with one or more easily extractable water-soluble sweeteners, such as natural sugar, soluble saccharin salts, aspartame, Acesulfame-K, water-soluble food acid and/or flavors. The resulting mix is then formed into sticks or tablets of chewing gum employing conventional techniques.

Preferred chewing gums in accordance with the present invention will have the following composition:

| Ingredient | Parts by Weight |
|---|---|
| Gum base | 12 to 35 |
| Preformed sweetener combination | |
| A. Solid sweetener Powdered sugar | 20 to 85 |
| B. Liquids | |
| High fructose syrup (40-90% solids) | 0 to 50 |
| Liquid glucose | 0 to 50 |
| Invert sugar | 0 to 50 |
| Flavor | 0.2 to 1.5 |
| Lecithin | 0 to 1 |
| Corn syrup solids | 0 to 15 |
| Glycerin | 0 to 2 |

The following Examples illustrate preferred embodiments of the present invention without, however, limiting the same thereto. All temperatures are expressed in °F.

EXAMPLE 1

A chewing gum is prepared from the following ingredients:

| | Parts by Weight |
|---|---|
| Gum base | 16.8 |
| Preformed sweetener combination | 70 |
| A. Solids | |
| Sucrose | 45 |
| B. Liquid | 25 |
| High fructose syrup (70% solids) | 25 |
| Liquid glucose (80% solids) | 20 |
| Invert sugar (70% solids) | 25 |
| Flavor | 0.8 |
| Color | 0.2 |
| Corn syrup solids | 8 |
| Lecithin | 0.4 |

The solids (A) and liquids (B) are mixed together and heated to 240° F. with constant agitation to form a homogeneous mass. The homogeneous mass is allowed to cool by exposure to ambient air for 20 minutes to cause the sweetener solids to recrystallize and form an amorphous mass.

The gum base is melted (160°-175° F.) and placed in a pre-heated standard dough mixer equipped with sigma blades. Color is added and mixed for 3-4 minutes. About one-third of the preformed amorphous sweetener mass is added and mixed for 1-3 minutes. Thereafter, another one-third portion of preformed amorphous sweetener mass is added and mixed for 2-3 minutes. The Maltrin is added and mixed for 1-2 minutes followed immediately with lecithin and flavor and mixed for about 2-3 minutes. The remaining preformed amorphous sweetener mass is added and the mixture mixed for 2-5 minutes.

The chewing gum prepared above is found to have a pleasant sweet taste, good softness retention, a smooth texture and amorphous bite-through and enhanced flavor and non-stick properties as well.

EXAMPLES 2 AND 3

Sugarless chewing gums are prepared from the following ingredients employing the procedure outlined in Example 1.

| | Parts by Weight | |
|---|---|---|
| | Ex. 2 | Ex. 3 |
| Gum base | 20 | 22 |
| Preformed sweetener combination | 70 | 70 |
| A. Solids | | |
| Sorbitol | 45 | 0 |
| Hydrogenated starch hydrolysate | 0 | 45 |
| B. Liquid | | |
| Sorbitol syrup | 25 | — |
| Hydrogenated starch hydrolysate syrup | 0 | 25 |
| Flavor | 0.8 | 0.8 |
| Color | 0.2 | 0.2 |
| Corn syrup solids | 8 | 8 |
| Lecithin | 0.4 | 0.4 |

The Examples 2 and 3 chewing gums are found to have a pleasant sweet taste, good softness retention, smooth and amorphous bite through and enhanced flavor, and non-stick properties as well.

What is claimed is:

1. A chewing gum having long-lasting sweetness, a soft and smooth consistency, an amorphous bite through, and non-stick properties, which comprises from about 8 to about 50% by weight gum base; and from about 40 to about 85% by weight of a preformed recrystallized sweetener combination formed of one or more solid sweeteners and one or more liquid sweeteners which coat said solid sweeteners, said combination comprising at least two natural sweeteners which have been recrystallized as a mixture, and dispersed as said recrystallized mixture in said gum base; and one or more flavors dispersed in said gum base; whereby crystals of solid sweetener in said preformed recrystallized sweetener combination are reduced in size, becoming more round, more smooth and slippery, due to the interaction with said liquid sweeteners present in said combination, thereby contributing to soft easy bite through and imparting a fondant-like structure to the chewing gum.

2. The chewing gum as defined in claim 1 wherein at least one of said sweeteners in said recrystallized mixture is sucrose.

3. The chewing gum as defined in claim 1 wherein at least one of said sweeteners in the recrystallized mixture is high fructose syrup or fructose dispersed in water.

4. The chewing gum as defined in claim 3 wherein said recrystallized mixture further includes liquid glucose, corn syrup, invert syrup or mixtures of two or more of such sweeteners.

5. The chewing gum as defined in claim 1 wherein said recrystallized mixture comprises sucrose, and high fructose syrup.

6. The chewing gum as defined in claim 5 wherein said recrystallized mixture further includes liquid glucose, corn syrup, hydrogenate starch hydrolysate, invert sugar, sorbitol syrup, or mixtures of two or more of such sweeteners.

7. The chewing gum as defined in claim 1 having a short fondant or nougat structure.

8. The chewing gum as defined in claim 1 wherein said solid sweetener comprises sucrose or sorbitol and said liquid sweetener comprises high fructose syrup, sorbitol syrup, hydrogenated starch hydrolysate, corn syrup, invert sugar or mixtures of two or more thereof.

9. The chewing gum as defined in claim 1 wherein said recrystallized mixture comprises recrystallized sorbitol and sorbitol syrup or hydrogenated starch hydrolysate.

10. The chewing gum as defined in claim 1 wherein said recrystallized mixture comprises from about 35 to about 95% by weight sucrose, from about 5 to about 50% by weight high fructose syrup, from about 1 to about 30% by weight liquid glucose, from about 1 to about 30% by weight corn syrup, and from about 1 to about 25% by weight invert sugar, all of said percents being based on the weight of the recrystallized mixture.

11. A method for preparing the chewing gum as defined in claim 1 which comprises heating and agitating a mixture of said at least two sweeteners, one of which contains water to form a homogeneous mass, and then cooling said mass to cause said sweeteners to recrystallize as a homogeneous mixture and form an amorphous mass, and dispersing said amorphous mass throughout said gum base to form a sweetened chewing gum.

12. The method as defined in claim 11 wherein a portion of said recrystallized sweetener mixture is added to said gum base, and softener and flavor are then added to said gum base, and the remainder of said recrystallized mixture is added to said gum base.

13. The method as defined in claim 12 wherein said recrystallized mixture comprises sucrose and high fructose syrup, corn syrup, glucose syrup and invert syrup.

14. The method as defined in claim 12 wherein said recrystallized mixture comprises sorbitol, hydrogenated starch hydrolysate, and sorbitol syrup.

15. Chewing gum prepared by the method as defind in claim 11.

* * * * *

UNITED STATES PATENT AND TRADEMARK OFFICE
CERTIFICATE OF CORRECTION

PATENT NO. : 4,271,199
DATED : June 2, 1981
INVENTOR(S) : Subraman R. Cherukuri et al.

It is certified that error appears in the above-identified patent and that said Letters Patent are hereby corrected as shown below:

Column 1, line 41, "crystallized" should read --recrystallized--.
Column 1, line 51, "soild" should read --solid--.
Column 4, line 48, "a" should read --as--.

Signed and Sealed this

Eighth Day of September 1981

[SEAL]

Attest:

GERALD J. MOSSINGHOFF

Attesting Officer          Commissioner of Patents and Trademarks